United States Patent [19]

Peitz, Sr.

[11] 4,363,386

[45] Dec. 14, 1982

[54] OVERRUNNING DRUM HAVING AN AMPLIFYING DEVICE

[76] Inventor: Josef Peitz, Sr., Pater Ewald Strasse 29, 4790 Paderborn, Fed. Rep. of Germany

[21] Appl. No.: 136,970

[22] Filed: Apr. 3, 1980

[30] Foreign Application Priority Data

Apr. 10, 1979 [DE] Fed. Rep. of Germany ....... 2914468

[51] Int. Cl.³ .............................................. F16D 51/60
[52] U.S. Cl. .................................... 188/331; 188/342; 188/136
[58] Field of Search ................... 188/112, 136, 140 R, 188/140 A, 331, 332, 333, 342; 192/35, 38

[56] References Cited

U.S. PATENT DOCUMENTS

| 1,873,389 | 8/1932 | Gunn ..................................... | 188/331 |
| 2,251,854 | 8/1941 | Parnell et al. ........................ | 188/333 |
| 3,563,348 | 2/1971 | Frost ..................................... | 192/35 |

FOREIGN PATENT DOCUMENTS

| 2023864 | 12/1971 | Fed. Rep. of Germany ...... | 188/332 |
| 509084 | 1/1955 | Italy .................................... | 188/331 |
| 280163 | 4/1928 | United Kingdom ................ | 188/332 |
| 737934 | 10/1955 | United Kingdom ................ | 188/342 |

*Primary Examiner*—Edward R. Kazenske
*Attorney, Agent, or Firm*—Michael J. Striker

[57] ABSTRACT

A wheel brake, particularly an overrunning wheel brake comprising a brake drum, first and second brake shoes movable in forward and rearward directions, amplifying formations arranged to cooperate with the first brake shoe and to amplify a force with which the first brake shoe is pressed against the brake drum, a displacing element for displacing the first brake shoe in the forward direction and thereby pressing the same against the brake drum with amplified pressure force, and an urging projection provided on the first brake shoe and arranged so that when the first brake shoe is displaced in the rearward direction, the projection displaces the second brake shoe which acts upon the amplifying formations and thereby the first brake shoe is again pressed against the brake drum with the amplified pressure force.

7 Claims, 5 Drawing Figures

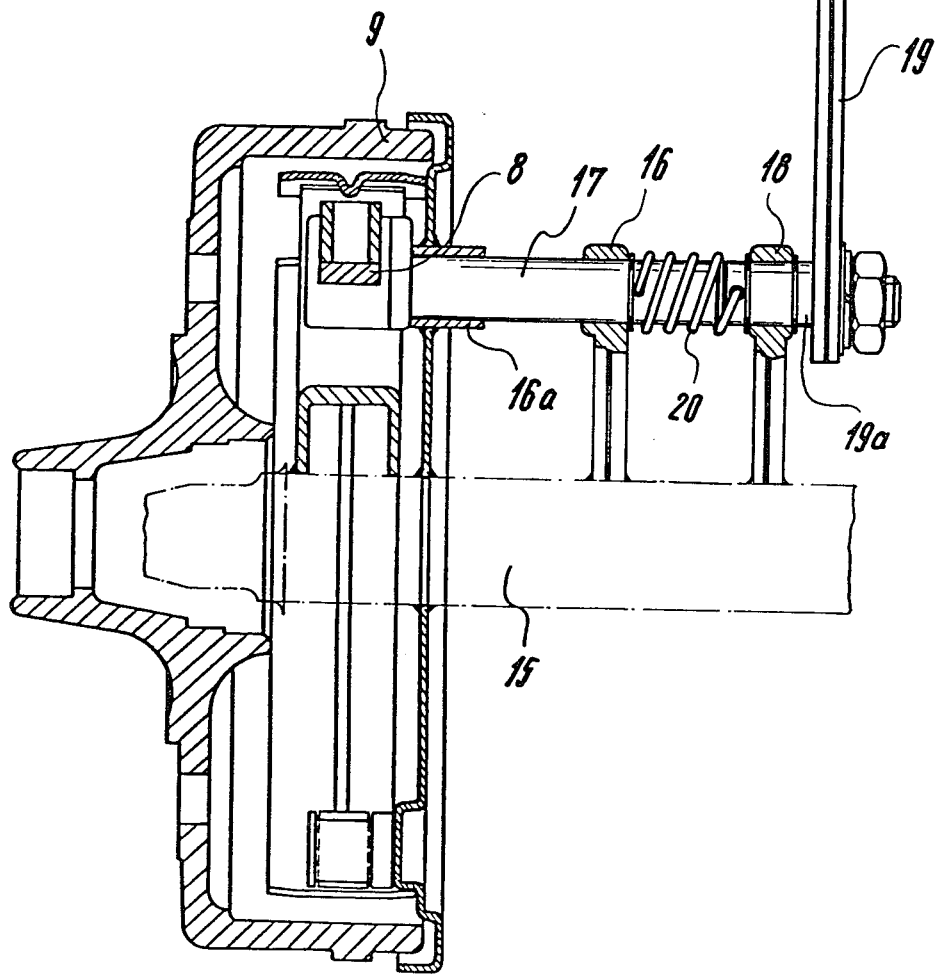

OVERRUNNING DRUM HAVING AN AMPLIFYING DEVICE

BACKGROUND OF THE INVENTION

The present invention relates to a wheel brake, and particularly to an overrunning wheel brake.

Overrunning wheel brakes are known, which have two brake shoes, a support provided with at least one guiding cam, guiding roller and the like and supporting one of the brake shoes which is operative to be pressed against a brake drum during movement in forward direction, and a tightening member acting in the operative direction of the first brake shoe and pressing the support member toward the brake drum. The second brake shoe abuts against the support member. The first brake shoe is provided, in the region of the guiding cam, guiding roller and the like of the support, with lifting tracks which, together with the outer curved wall of the brake shoe, form wedging faces converging in the operative direction of the first brake shoe. The second brake shoe abuts during the forward movement against a stationary abutment member.

The provision in the above-mentioned wheel brake of the lifting tracks on the first brake shoe and the abutment of these lifting tracks against the guiding cams, guiding rollers or the like of the support member provide for enormous braking force in forward direction, inasmuch as the first brake shoe is substantially wedged against the brake drum via the above-mentioned lifting tracks. However, this action does not take place during reverse movement.

SUMMARY OF THE INVENTION

Accordingly, it is an object of the present invention to provide a wheel brake which avoids the disadvantages of the prior art.

More particularly, it is an object of the present invention to provide a wheel brake in which a brake shoe is firmly pressed against a brake drum not only during braking in forward direction, but also during braking in reverse direction.

In keeping with these objects and with others which will become apparent hereinafter, one feature of the present invention resides, briefly stated, in a wheel brake having a brake drum, first and second brake shoes, amplifying means arranged to amplify a force with which the first brake shoe is pressed against the brake drum, means for displacing the first brake shoe so that when the first brake shoe displaces in a forward direction it cooperates with the amplifying means and is pressed against the brake drum with the amplified pressure force, wherein urging means is provided on the first brake shoe and arranged so that when the first brake shoe is displaced in a rearward direction, the urging means displaces the second brake shoe, the second brake shoe acts upon the amplifying means, and the amplifying means cooperates with the first brake shoe whereby the latter is again pressed against the brake drum with the amplified pressure force.

When the wheel brake is constructed in accordance with the present invention, the second brake shoe during braking in reverse direction is displaced in circumferential direction by the first brake shoe. A support which carries the first brake shoe is respectively displaced in circumferential direction. The amplifying means is formed by guiding cams, guiding rolls and the like provided on the support member, on the one hand, and lifting tracks provided on the first brake shoe, on the other hand. When the support displaces in the circumferential direction, the guiding elements of the support act upon the lifting tracks of the first brake shoe whereby the latter is pressed against the braking drum. Thereby, during braking in reverse direction the above-mentioned enormously high braking force also takes place as a result of the provision of the lifting tracks and the abutment of the latter against the guiding cams, rollers and the like of the support member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a view showing a further embodiment of the invention.

DESCRIPTION OF A PREFERRED EMBODIMENT

Figure 1:
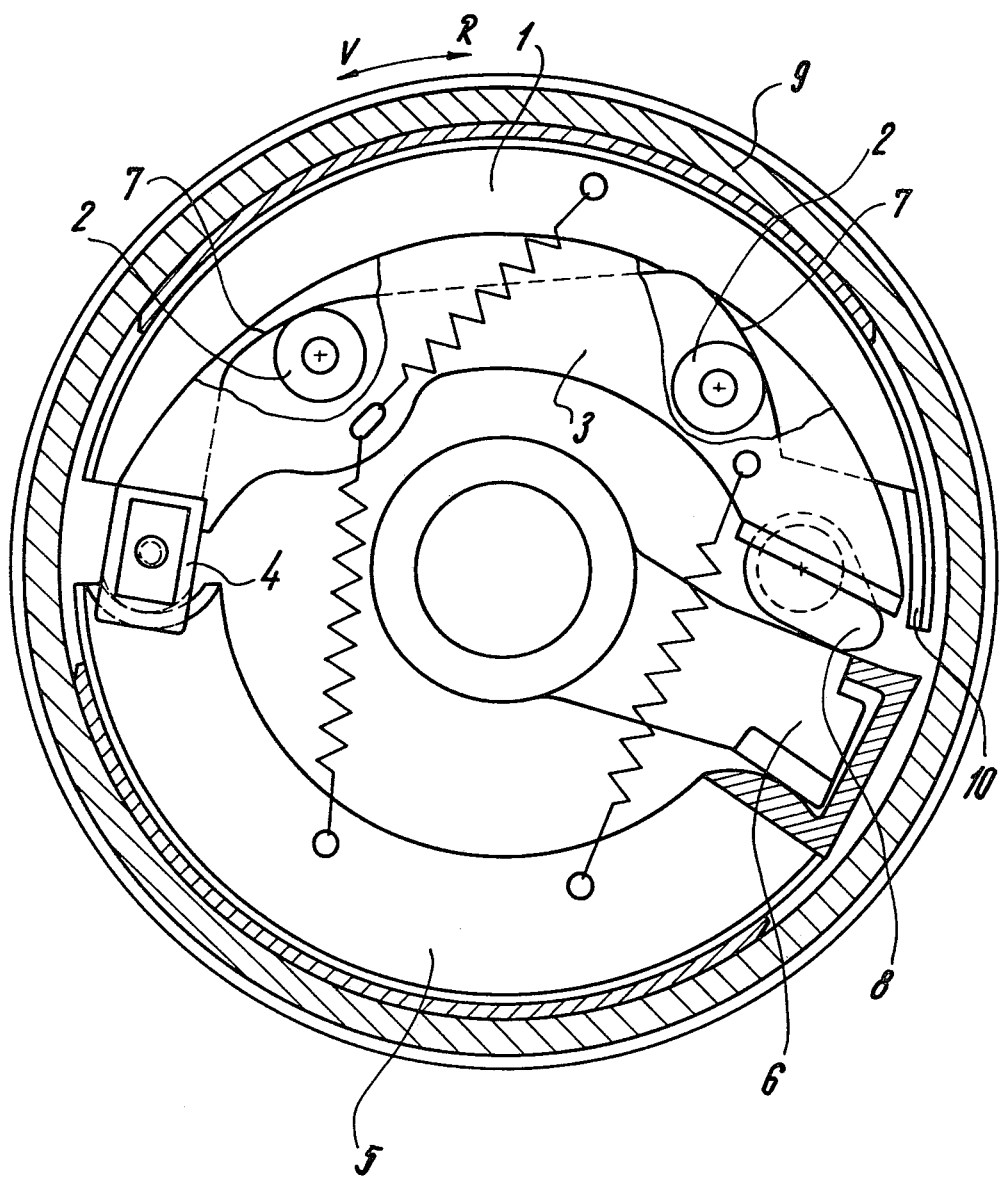
FIG. 1 is a view showing a section of an overrunning wheel brake in accordance with the present invention in normal position, that is in unbraked condition.
Figure 1A:
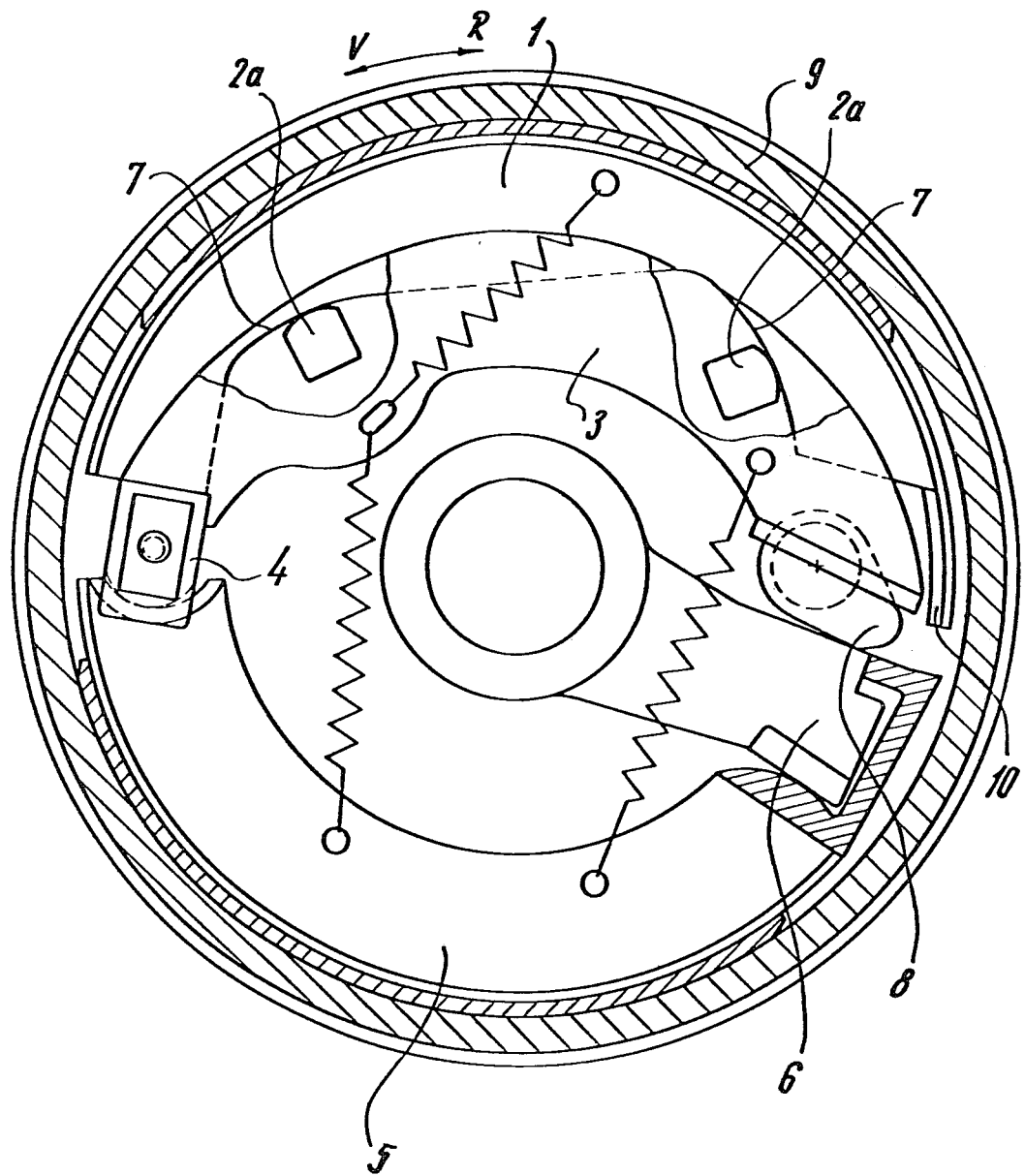
FIG. 1a is a view substantially corresponding to the view of FIG. 1, but showing another embodiment of the invention.

An overrunning wheel brake in accordance with the invention has a first brake shoe 1 which is operative during forward movement or, in other words, is arranged to move toward a brake drum 9 during forward movement. The first brake shoe 1 is mounted on a support member 3. The support member 3 is provided with guiding elements such as guiding rollers 2 (FIG. 1). The guiding elements may also be formed as guiding cams 2a (FIG. 1a) and the like.

A second brake shoe abuts against the support member 3 via a locking piece 4. The other end of the second brake shoe 5 abuts against a stationary abutment member 6 during the forward movement. A double headed arrow provided with the letters V and R designates the forward movement and the reverse movement.

The first braking shoe 1 has regions in which it rests on the guiding rollers 2 of the support member 3. In these regions the first brake shoe 1 is provided with lifting tracks 7. The lifting tracks 7 together with the outer curve of the first brake shoe 1 form a wedge surface which converges in the operative or running direction of the first brake shoe. A tightening member 8 is provided, which forces the support member 3 toward the brake drum 9.

The wheel brake shown in the drawing is an overrunning wheel brake. A characteristic feature of this overrunning wheel brake resides in that the tightening member 8 during running of a trailer toward a tractor is actuated by an overrunning mechanism.

When the tightening member 8 during forward movement from the normal position shown in FIG. 1 is actuated by the overrunning mechanism, the support member 3 is first insignificantly displaced in forward direction and simultaneously forced toward the braking drum 9. Thereby, the first brake shoe 1 is pressed against the brake drum 9, and the first brake shoe 1 because of the thus caused friction contact, is also displaced in forward direction. During this circumferential displacement, the first brake shoe 1 runs by its lifting tracks 7 firmly against the brake drum 9 and thereby very high braking force takes place. The second brake shoe 5 is also firmly pressed against the brake drum 9 via the support 3, so as to provide for uniform braking via both braking shoes 1 and 5.

Figure 2:
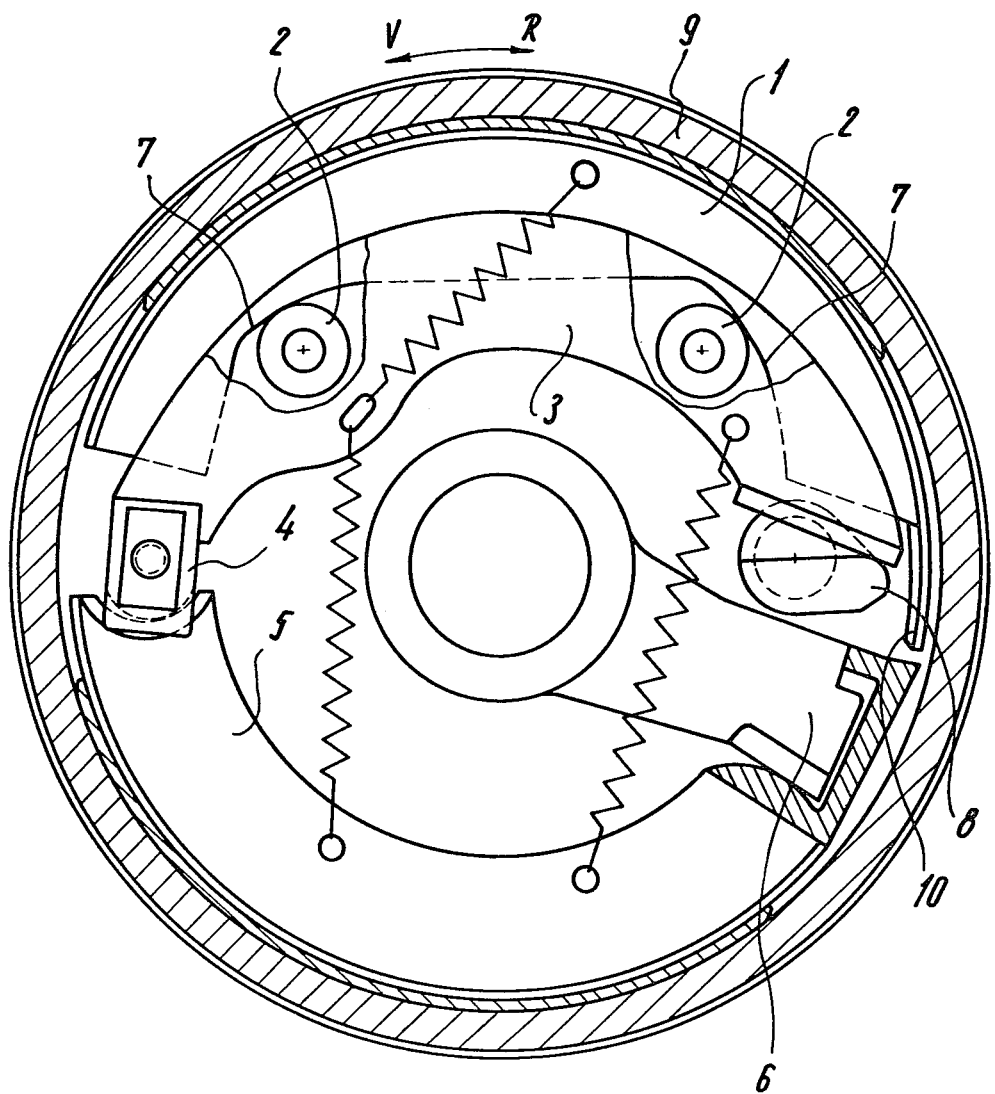
FIG. 2 is a section showing the wheel brake of FIG. 1, but during reverse movement.

When a trailer provided with the inventive overrunning wheel brake moves in reverse direction by the tractor, the tightening member 8 is again actuated via the overrunning mechanism and assumes a position shown in FIG. 2. During the reverse movement the first brake shoe 1 is displaced in reverse direction because of the friction contact between its friction coating and the brake drum 9. The first brake shoe 1 runs along its lifting tracks 7 "freely". In other words, during reverse movement the first brake 2 does not provide for braking action.

In overrunning wheel brakes with so-called "reverse automatic means", it is conventional to adjust the tightening member 8 further via a hand brake mechanism, as in the case of the overrunning mechanism. This construction can also be utilized in the present overrunning wheel brake. The greater adjustment of the tightening element which can be attained by a hand braking mechanism allows to force the support member 3 against the brake drum 9 to considerably higher extent than in the case of the overrunning mechanism.

The above-mentioned stronger forcing of the support 3 against the brake drum 9 results in the fact that the first braking shoe 1 is taken along circumferentially in direction of the reverse movement, when the vehicle moves in reverse direction.

As can be seen from the drawings, the first braking shoe 1 is provided with a projection 10 which during displacement of the first brake shoe 1 in reverse direction, acts upon the second brake shoe 5. More particularly, it acts upon an end portion of the second brake shoe 5, the end portion facing toward the tightening member 8. Thereby, the second braking member 5 is urged in circumferential direction, that is the first braking member 1 displaces the second brake member 5 in reverse direction. Thereby, the support member 3 is also displaced in reverse direction, and the guiding rollers 2 run along the lifting tracks 7 of the first brake shoe 1 in lifting direction. As a result of this the first brake shoe 1 is pressed stronger against the brake drum 9.

Figure 3:
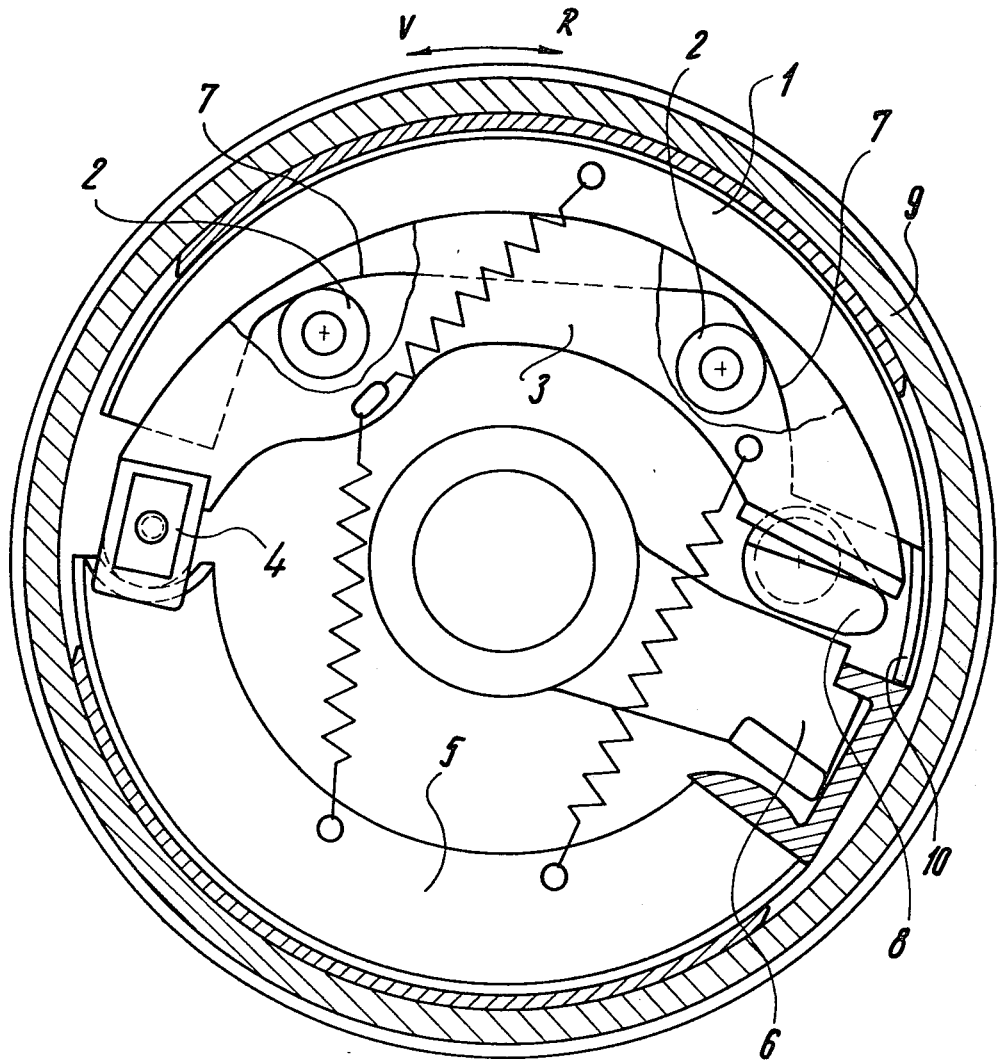
FIG. 3 is a section of the wheel brake in accordance with the invention, after action of a not shown hand braking mechanism.

In order to prevent excessive loading of the tightening member 8 by the generated braking force, the tightening member 8 is actuated via an actuating mechanism which allows swinging of the tightening member 8 against the action of the tightening force in the case when the generated braking force is greater than the tightening force, as is the case during braking in reverse direction. As can be seen further from FIG. 3, the tightening member 8 during braking in reverse direction turns back in direction of the abutment 6 and finally comes to abutment against the latter so that the generated braking force is absorbed by the abutment 6.

An actuating mechanism which is torsionally elastic and dependent on load, and arranged to displace the tightening member 8 is shown in FIG. 4. As can be seen from this Figure, the tightening member 8 is mounted on a shaft 17 which is supported by a bearing 16 mounted on a wheel axle 15, on the one hand, and by a bearing 16a of a brake cover, on the other hand. A lever 19 is pivotally supported by a further bearing 18 which is also mounted on the wheel axle 15. The lever 19 can be actuated via an overrunning brake-rod linkage, via a hand brake lever or via other means.

No firm connection is provided between the shaft 17 and a pivot pin 19a of the lever 19. A torsion spring is arranged between the above-mentioned members and is so prestressed that the tightening member 8 is always loaded in a tightening direction, whereby the corresponding movement is transmitted via the torsion spring 20 to the shaft 17 and the tightening member 8. When the force acting in the case of the tightened lever 19 onto the tightening member 8 is greater than the force of the torsion spring 20, the tightening member 8 can turn back against the action of the torsion spring 20.

Even though the guiding elements of the support member 3 are shown as guiding rollers, other guiding elements such as guiding cams and the like may be provided. Furthermore, the inventive concept can be realized also in a wheel brake without overrunning mechanism.

In a wheel brake without the overrunning mechanism, the tightening member 8 is actuated, for example, via a pressure-medium-operated cylinder-and-piston unit, so that during movements in both directions the braking process can be carried out exclusively by actuation of the tightening member 8. In this case it is advantageous to form the projection 10 of such a length that the projection 10 in unbraked condition is located almost directly on the facing end of the second brake shoe 5. Thereby, during reverse movement and actuation of the tightening member 8, the braking action takes place without any delay.

The locking member 4 via which the support member 3 and the second brake shoe 5 abut against one another, is preferably formed as an adjusting device which allows spreading apart of the support member 3 and the second brake shoe 5 when the braking coating is worn to high extent.

It will be understood that each of the elements described above, or two or more together, may also find a useful application in other types of constructions differing from the types described above.

While the invention has been illustrated and described as embodied in a wheel brake, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A wheel brake, particularly an overrunning wheel brake, comprising a brake drum having an axis; a first brake shoe displaceable in forward and rearward directions and arranged to move toward said brake drum in a radial direction to be pressed against said brake drum with a pressure force; a support member which supports said first brake shoe; a second brake shoe connected with and together with said support member and displaceable in said forward and rearward directions and also arranged to be pressed against said brake drum with a pressure force; amplifying means arranged to cooperate with only said first brake shoe and to amplify the pressure force with which said first brake shoe is pressed against said brake drum, said amplifying means including a first formation provided on said support member and a second formation provided on said first brake shoe and cooperating with said first formation so as to amplify the pressure force during movement of said first brake shoe in said forward direction, said second formation on said first brake shoe being formed by a curved outer surface portion adjacent said drum and a lifting track portion adjacent said support member, said curved outer portion and said lifting track portion forming a wedge-shaped portion on said first brake shoe converging in said forward direction, said first formation including a guiding member on said support member cooperating with said wedge-shaped portion; means for displacing said first brake shoe in said forward direction so that, upon the displacement in said forward direction, said first brake shoe cooperates with said amplifying means and is pressed against said brake drum with the amplified pressure force, said displacing means including a tightening member arranged to act on said support member so as to displace said support member together with said first brake shoe in said radial direction; and urging means provided on said first brake shoe and normally spaced from said second brake shoe, said urging means arranged so that, when said first brake shoe is displaced in said rearward direction, said urging means abuts an end portion of said second brake shoe and urges and displaces said second brake shoe in said rearward direction, said second brake shoe acts upon said support member and thereby on said amplifying means which, in turn, cooperates with said first brake shoe, thereby said first brake shoe is also pressed against said brake drum with the amplified pressure force, so that said first brake shoe is pressed against said brake drum with the amplified pressure force not only during the displacement in said forward direction but also during the displacement in said rearward direction, said first brake shoe having an open end portion facing toward said tightening member, and said urging means being provided on said end portion of said first brake shoe, and arranged to displace said second brake shoe in a circumferential direction.

2. A wheel brake as defined in claim 1, wherein said guiding member is a guiding cam cooperating with said wedge-shaped portion.

3. A wheel brake as defined in claim 1, wherein said guiding member is a guiding roller cooperating with said wedge-shaped portion.

4. A wheel brake as defined in claim 1; and further comprising an abutment member against which said second brake shoe abuts during the displacement in said forward direction.

5. A wheel brake as defined in claim 1, wherein said urging means includes a projection.

6. A wheel brake as defined in claim 1, wherein said urging means includes a cam.

7. A wheel brake as defined in claim 1; and further comprising an actuating mechanism which is torsionally elastic and dependent on load and arranged to displace said tightening member.

* * * * *